United States Patent [19]

Hiss

[11] 4,086,930
[45] May 2, 1978

[54] AUTOMATIC TRANSMISSION TORQUE CONVERTER FLUSHER

[76] Inventor: William K. Hiss, 7101 Belair Rd., Baltimore, Md. 21206

[21] Appl. No.: 679,161

[22] Filed: Apr. 22, 1976

[51] Int. Cl.² .............................................. B08B 9/00
[52] U.S. Cl. ........................... 134/168 R; 134/169 A; 60/336
[58] Field of Search ........... 134/169 A, 169 R, 169 C, 134/168 R, 112; 60/327, 336, 378

[56] References Cited

U.S. PATENT DOCUMENTS

| 2,104,456 | 1/1938 | Friedman | 134/112 UX |
| 3,528,854 | 9/1970 | Rutherford | 134/169 R X |
| 3,584,633 | 6/1971 | Arrigo | 134/169 A X |
| 3,611,723 | 10/1971 | Theis, Jr. | 60/327 |

Primary Examiner—Robert L. Bleutge
Attorney, Agent, or Firm—J. Wesley Everett

[57] ABSTRACT

An improved apparatus for cleaning automatic automotive torque converters in which the torque converter consists of a hollow casing, the casing having a single opening and a hollow hub surrounding the casing opening and extending outwardly from the outer surface thereof, the turbine being provided with a central internally grooved bore extending through the center of the turbine coaxially with the hollow hub, the cleaning apparatus having a fluid reservoir and a stationary support for the casing and a fluid pressure pump for supplying the cleaner fluid to a fluid directing unit having a fluid inlet and a fluid outlet and a motor for rotating the turbine and operating the fluid pressure pump, the fluid directing unit directing the fluid under pressure through a central bore of the turbine and inner surface of the casing to the fluid directing unit and out the outlet opening therein to the reservoir for recycling the cleaner fluid through the torque converter.

3 Claims, 7 Drawing Figures

AUTOMATIC TRANSMISSION TORQUE CONVERTER FLUSHER

The present invention relates to an improved apparatus for cleaning torque converters of automatic transmission by flushing a cleaning liquid, or solvent, through the torque converter for removing any potentially injurious substances which may interfere with the proper operation of the torque converter.

Other devices have been provided for cleaning torque converters, an example being U.S. patent to Arrigo, U.S. Pat. No. 3,584,633, in which a cleaning liquid, or solvent, is introduced into the casing and exhausted through a puncture made in the casing of the torque converter which is later closed by soldering or welding, whereas in the present invention the cleaning liquid, or solvent, is introduced through a hollow spindle to a central bore in the turbine of the torque converter and exhausted through the hollow casing hub.

The primary object of the invention is to provide an improved means for extracting the spent cleaning fluid, or solvent, from the torque converter without the necessity of puncturing the converter casing.

Another object of the invention is to provide an improved means carried by the turbine rotating spindle which will accommodate different sized bores in the turbine.

A further object of the invention is to provide an improved method of cleaning torque converters.

With these and other objects in view the invention consists in the novel combination, structure and relative positions of the several parts and members, illustrated in the accompanying drawings described in the following specifications and as particularly pointed out in the appended claims.

Referring to the drawings which illustrate one embodiment of the invention, and in which like reference characters denote like and similar parts throughout the several views.

Figure 2:
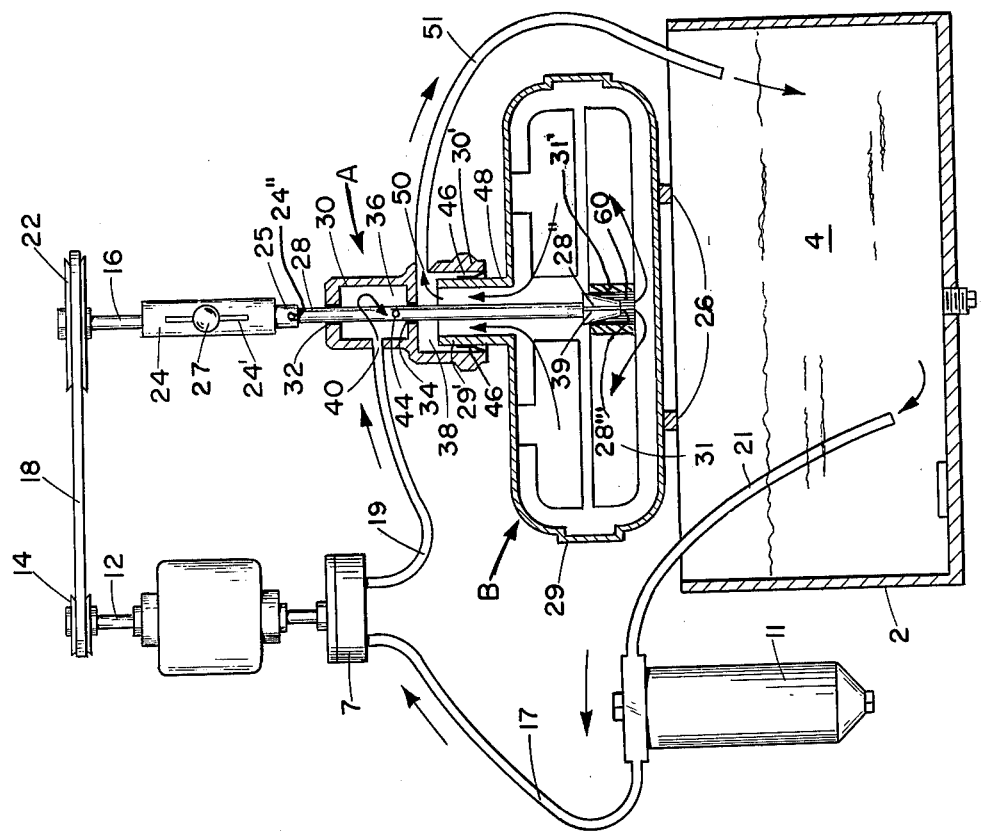
FIG. 2 is a diagrammatical view partly in section and partly in elevation, showing the various elements of the apparatus in working relationship.

Referring to the drawings there is provided a table 1 having supporting legs 1' on which the apparatus is supported.

The table is provided with an opening into which a reservoir, or tank, 2 is supported. Within the reservoir or tank 2 there is placed a predetermined amount of cleaning fluid, or solvent 4. However, the reservoir, or tank may be supported independently by any suitable means. Extending upwardly from the upper surface of the table 1 is a post 6 having a horizontal arm 8. Supported upon the post 6 is a suitable electrically operated motor 10 having a rotatable shaft 12 extending outwardly from each end of the motor. On one end of the shaft 12 is a pulley 14. The pulley is adapted to operate a shaft 16 through a suitable drive means, such as a belt 18 and pulley 22, fixed to the upper end of the shaft 16.

Figure 1:
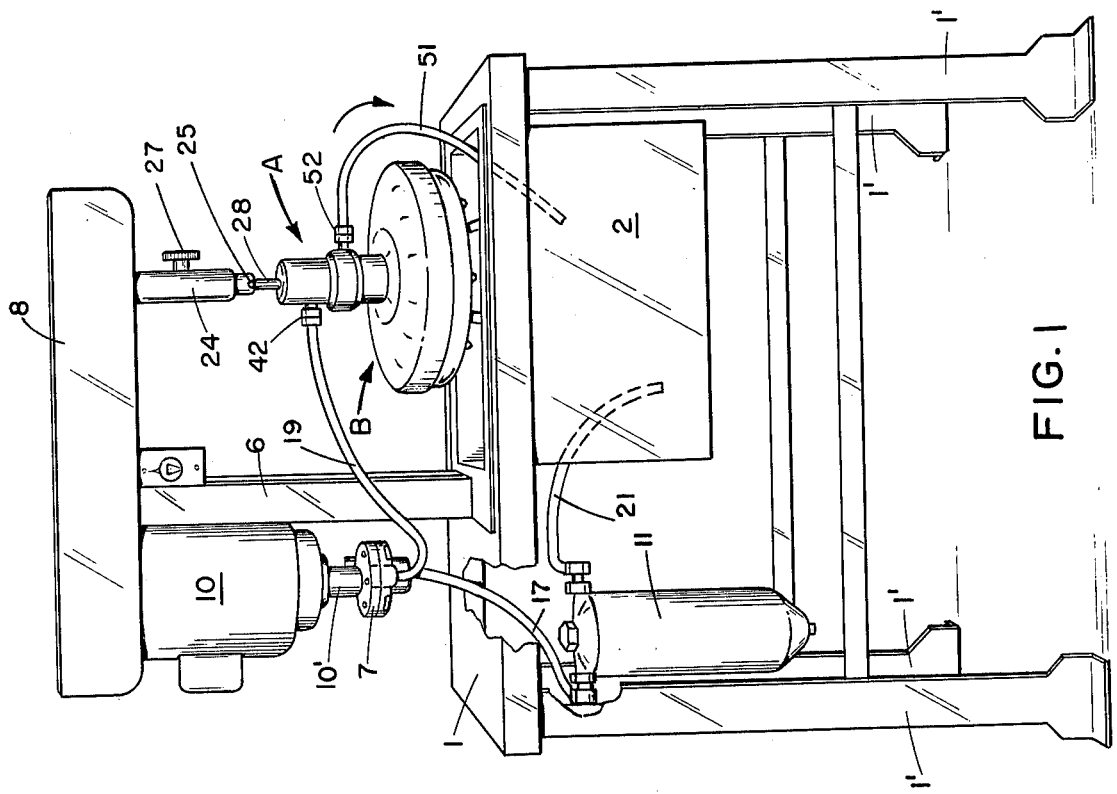
FIG. 1 is a view in perspective of the apparatus illustrating the manner in which the apparatus is used.
Figure 3:
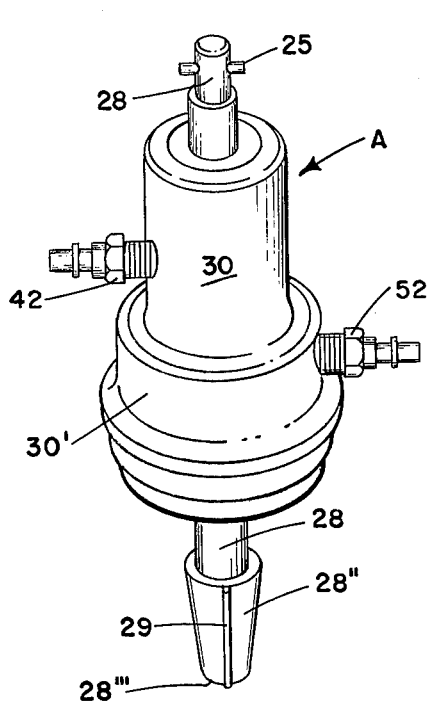
FIG. 3 is a perspective view in elevation of the liquid directing unit.
Figure 5:
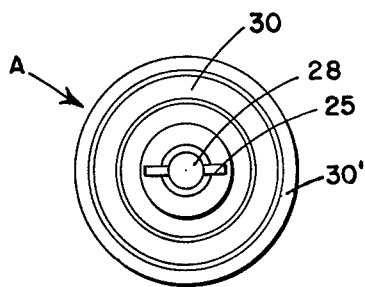
FIG. 5 is a top plan view of the liquid directing unit.

The shaft 16 is rotatably supported to a bearing (not shown) carried by the arm 8. Affixed to the opposite end of the shaft 16 is one end of a coupling unit 24 which is vertically slideable on the shaft 16. In order to fix the location of the slideable coupling unit 24 relative to the shaft 16 there is provided a rotatable thumb screw 27 threadably attached to the shaft 16 which operates within a slot 24' in the coupling unit. The opposite end of the coupling member 24 is provided with a slot 24" for detachably receiving a pin 25 fixed to the upper outer end of a rotating spindle 28. The spindle 28 is a part of a liquid directing unit A and is of such length and form as to extend into the torque converter unit B and engage the central bore 31' of the turbine 31 of a torque converter unit B. In use, the torque converter is placed on the table 1 below the liquid directing unit A as shown in FIGS. 1 and 2. The casing 29 of the torque converter is shown supported on suitable members 26 to hold it against rotation.

On the opposite end of the motor 10 there is mounted a housing 10' adapted to support a liquid pressure pump 7 having a conduit 17 leading from a filter 11 to the intake opening of the pump 7 and a conduit 19 leading from the pump outlet to the liquid directing unit A. The filter 11 is supplied with the cleaning liquid, or solvent, by the conduit 21.

Figure 4:
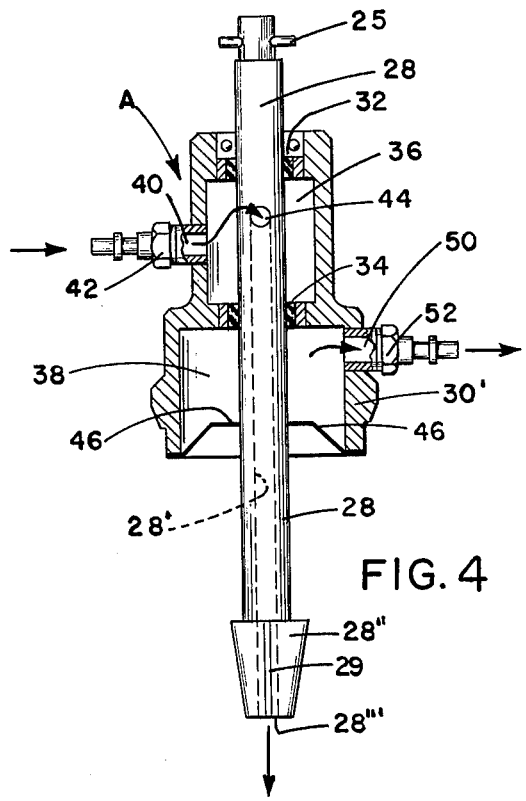
FIG. 4 is a vertical sectional view of the liquid directing unit shown in FIG. 1.
Figure 7:
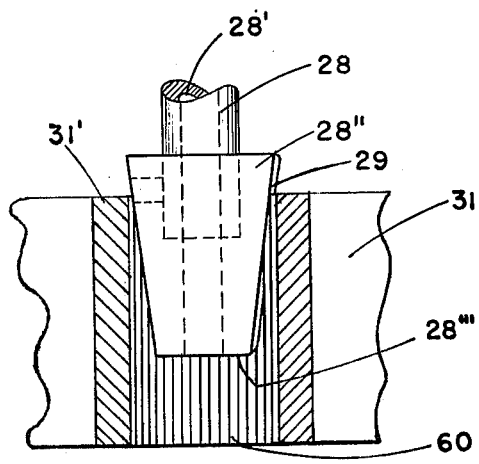
FIG. 7 is an enlarged sectional view taken along a plane bisecting the longitudinal axis of the turbine hub.
Figure 6:
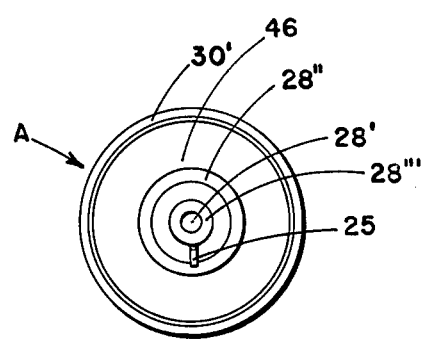
FIG. 6 is a bottom view of the same.

The liquid directing unit A is divided into upper and lower compartments 36 and 38 respectively having fluid-tight bearings 32 and 34 in which the turbine driving spindle 28 is rotated. The spindle 28 is adjustable to a limited degree axially of the unit for adjusting the spindle 28 to difference sizes and types of torque converters. The compartment 36 is provided with an opening 40 adapted to receive a fixture 42 for receiving one end of the cleaning liquid supply conduit 19. The spindle 28 is provided with a central opening 28', as shown in FIG. 4. At the upper end of the central opening 28' is an aperture 44 to admit the cleaning liquid to the opening 28' in the spindle to be fed to the central opening 31' of the turbine 31. The vertical adjustment of the spindle 28 is never greater than the distance between the bearings 32 and 34 in order to keep the aperture 44 always positioned within the upper compartment 36.

The lower end 30' of the liquid directing unit A forming the second compartment 38 is in the form of an inverted cup and is of such diameter as to receive the hollow hub 29' of the casing 29. Secured to the inner surface of the cup-shaped portion 30' is an apertured flexible collar 46 surrounding the spindle 28 and is stretchable to engage the outer surface of the hollow hub 29' to prevent leakage of the liquid being forced out of the second compartment 38.

The second compartment 38 is also provided with an opening 50 for receiving a fitting 52 adapted to receive one end of a hose 51 leading back to the reservoir 2 for discharging the liquid cleaning fluid after it has passed through the torque converter.

Referring in particular to the turbine 31 which rotates within the casing 29, the central opening 31' of the turbine is provided with a bore having grooves 60 about its inner surface to receive a splined drive shaft. These bores come in slightly different sizes to accommodate different size drive shafts; therefore, the lower end of the spindle 28 is provided with a tapered end portion 28" adapted to engage various size turbine bores. The smaller end 28'" of the taper extending outwardly from the spindle is of such size that it will fit practically all size bores carried by different turbines. Extending outwardly along the surface of the tapered portion 28", and affixed thereto, is a single rib or spline 39 which is in a plane with the axis of the spindle member 28 in order to engage one of the grooves formed on the inner surface of the bore in the turbine for rotating the same.

In the cleaning operation of the present apparatus the casing is held in a stationary position while the turbine is rotated relative thereto.

The cleaning liquid, or solvent 4 is introduced into the upper section 30 of the torque converter B through the aperture 14 by way of hollow spindle 28 leading to the turbine 31, for removing undesirable substances and particles that are in the converter, after which the cleaning liquid is forced out of the torque converter by way of the hollow hub 29' of the casing 29 through the second compartment 38 to the opening 50 and the conduit 51 to the reservoir 2. At the same time, the cleaning liquid from the reservoir 2 is being picked up by the pump 7 by means of the conduit 21 and after passing through a filter 11 may be recycled through the conduit 17 and 19 to the torque converter. By using this method of directing the cleaning fluid, or solvent, through the torque converter it is not necessary to puncture the converter casing to allow the cleaning fluid, or solvent, to be drained from the converter casing.

However, the method depicted is not necessarily limited to the present apparatus, for example, the method would involve introducing a cleaning liquid within the casing and rotating either the casing element or turbine element while one is held in a stationary position, or both elements may be rotated in opposite directions or in the same direction at the same or different speeds to obtain a swishing action within the casing and draining the cleaning liquid from the casing through the hollow hub of the casing.

While the invention is shown and described in a specific form, it is not intended as a limitation as the scope of the invention is best defined in the appended claims.

What is claimed in the invention is:

1. An improved machine for fluid cleaning automotive torque converters in which the torque converter comprises a hollow casing and a turbine independently rotatable within said casing wherein said casing is provided with a single opening within the casing and a hollow hub extending outwardly about said opening and beyond the outer surface of the casing and the turbine having an internal grooved opening extending centrally through the turbine and coaxially with the hollow open in the hub for receiving a driving means therefor and means for retaining the fluid cleaner comprising in combination:
   a. means for fixedly positioning said torque converter with the hub extending upwardly,
   b. a vertically rotatable drive shaft having means for supporting said shaft coaxially with the hub opening for rotating said turbine, including means for rotating said shaft,
   c. a fluid directing unit for directing the cleaning fluid through said torque converter, said unit having a single casing including an upper and lower compartment including vertical adjustable spindle extending centrally and beyond the ends of the two compartments, one end of the spindle adapted to releasably engage at least one of the grooves in the turbine central opening for rotating the same,
   d. a liquid tight seal positioned between the upper end of the spindle and the upper end of the fluid directing casing and a liquid tight seal positioned between the two compartments and means for sealing the lower compartment about the hub of the torque converter,
   e. said spindle being hollow from a point positioned adjacent the first compartment and through the lower end thereof and having an opening therein leading from the first compartment to the lower end of the hollow spindle engaging the hollow opening in the turbine,
   f. a liquid pressure pump for circulating the cleaning fluid,
   g. means connecting the pump with an inlet in the upper compartment for supplying the cleaning fluid thereto wherein the cleaning fluid is directed through the hollow spindle into the hollow central opening in the turbine after which the cleaning fluid is forced in contact with the inner surface of the casing with the aid of the rotatable turbine and outwardly through the hub to the lower compartment of the fluid directing unit,
   h. said lower compartment having an outlet opening therein for exhausting the said cleaning fluid to the fluid supply means and means for recycling the cleaning fluid through the said torque converter.

2. An improved torque converter cleaning apparatus as claimed in claim 1 wherein the lower compartment is provided with an expandable sealing means for accommodating the casing hubs of various sizes.

3. An improved torque converter cleaning apparatus as claimed in claim 1 wherein the end of the spindle engaging the grooved opening in the turbine hub is of cone-shaped form tapered inwardly toward its lower end for engaging a variety of sizes of openings in the turbine bug and having a single spline positioned along its tapered side to engage at least one of the grooves carried on the inner surface of the hub opening of the turbine.

* * * * *

UNITED STATES PATENT OFFICE
CERTIFICATE OF CORRECTION

Patent No. 4,086,930          Dated May 2, 1978

Inventor(s) WILLIAM K. HISS

It is certified that error appears in the above-identified patent and that said Letters Patent are hereby corrected as shown below:

Column 2, line 31, after "unit" insert -- A --

Column 3, line 11, after "aperture" change "14" to -- 44 -- line 20, change "conduit" to -- conduits --

Column 4, Claim 3, line 49, change "bug" to -- hub --

Signed and Sealed this

Third Day of April 1979

[SEAL]

Attest:

RUTH C. MASON
Attesting Officer

DONALD W. BANNER
Commissioner of Patents and Trademarks